US007752560B2

(12) United States Patent  (10) Patent No.: US 7,752,560 B2
Bailey et al.  (45) Date of Patent: Jul. 6, 2010

(54) SYSTEMS AND METHODS FOR CREATING AND MANAGING GRAPHICAL USER INTERFACE LISTS

(75) Inventors: Richard St. Clair Bailey, Bellevue, WA (US); Stephen Russell Falcon, Woodinville, WA (US); Timothy Sharpe, Redmond, WA (US); Kirk Shoop, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 11/031,589

(22) Filed: Jan. 7, 2005

(65) Prior Publication Data

US 2005/0120361 A1    Jun. 2, 2005

Related U.S. Application Data

(63) Continuation of application No. 10/072,396, filed on Feb. 5, 2002, now Pat. No. 7,603,627.

(51) Int. Cl.
G06F 3/00      (2006.01)

(52) U.S. Cl. ................ 715/764; 715/829; 715/830; 715/833; 715/866

(58) Field of Classification Search ........... 715/764, 715/829, 830, 833, 826, 866
See application file for complete search history.

(56) References Cited

U.S. PATENT DOCUMENTS

| 4,772,882 | A | * | 9/1988 | Mical ............... 715/823 |
| 5,001,697 | A | | 3/1991 | Torres |
| 5,748,974 | A | | 5/1998 | Johnson |
| 5,796,401 | A | | 8/1998 | Winer |
| 5,797,123 | A | | 8/1998 | Chou et al. |
| 5,838,969 | A | | 11/1998 | Jacklin et al. |
| 5,842,165 | A | | 11/1998 | Raman et al. |
| 5,854,629 | A | | 12/1998 | Redpath |
| 6,061,653 | A | | 5/2000 | Fisher et al. |
| 6,065,041 | A | * | 5/2000 | Lum et al. ............ 709/203 |
| 6,081,816 | A | | 6/2000 | Agrawal |
| 6,125,347 | A | | 9/2000 | Cote et al. |
| 6,192,339 | B1 | | 2/2001 | Cox |
| 6,233,559 | B1 | | 5/2001 | Balakrishnan |
| 6,289,395 | B1 | | 9/2001 | Apte et al. |
| 6,310,629 | B1 | | 10/2001 | Mathusamy et al. |
| 6,434,529 | B1 | | 8/2002 | Walker et al. |
| 6,456,305 | B1 | | 9/2002 | Qureshi et al. |
| 6,456,974 | B1 | | 9/2002 | Baker et al. |

(Continued)

OTHER PUBLICATIONS

"Winamp2: Winamp's Submindow", retrieved from http://www.winamp-faq.de/english/wa2/documentation/sub.htm. on Sep. 28, 2004.

(Continued)

*Primary Examiner*—Kieu Vu
*Assistant Examiner*—Michael Roswell

(57) ABSTRACT

Systems and methods are described for providing a standard list function to create a graphical user interface list and list manager while allowing the graphical user interface to vary by appearance. An application developer can include a list manager control in an application. Properties are set that link the list manager to display controls, a data source and a scrolling behavior source. The list manager provides the appropriate content to the display controls in response to user selections of the display controls. The display controls and a user interface that contains them may vary without altering the basic functionality of the list manager.

13 Claims, 4 Drawing Sheets

U.S. PATENT DOCUMENTS

| | | | |
|---|---|---|---|
| 6,463,413 | B1 | 10/2002 | Applebaum et al. |
| 6,469,711 | B2 | 10/2002 | Foreman et al. |
| 6,507,817 | B1 | 1/2003 | Wolfe et al. |
| 6,701,383 | B1 | 3/2004 | Wallace et al. |
| 6,785,654 | B2 | 8/2004 | Cyr et al. |
| 6,965,770 | B2 | 11/2005 | Walsh et al. |
| 6,993,508 | B1 | 1/2006 | Major et al. |
| 7,020,848 | B2 | 3/2006 | Rosenzweig et al. |
| 7,073,130 | B2 * | 7/2006 | Novak et al. ............. 715/744 |
| 7,590,943 | B2 | 9/2009 | Bailey et al. |
| 7,603,627 | B2 | 10/2009 | Bailey et al. |
| 2002/0024539 | A1 | 2/2002 | Eleftheriadis et al. |
| 2002/0055928 | A1 * | 5/2002 | Worthington ............. 707/102 |
| 2002/0095290 | A1 | 7/2002 | Kahn et al. |
| 2003/0050777 | A1 | 3/2003 | Walker, Jr. |

OTHER PUBLICATIONS

"Winamp.com Skins", retrieved from http://www.winamp.com/skins , on Sep. 27, 2004.

"Skin (computing)", retrieved from http://en.wikipedia.org/wiki/Skin_%28computing%29 on Sep. 27, 2004.

"Winamp 3 Preview", retrieved from http://www.mp3newswire.net/stories/2001/winamp3.htm, May 23, 2001.

"Non Final Office Action", U.S. Appl. No. 10/072,396, filed Oct. 2, 2008,10 pages.

"Non Final Office Action", U.S. Appl. No. 11/062,526, filed Nov. 26, 2008,12 pages.

"Notice of Allowance", U.S. Appl. No. 11/062,526, filed Jun. 29, 2009,7 pages.

"Notice of Allowance", U.S. Appl. No. 10/072,396, filed Jun. 12, 2009,36 pages.

"Notice of Allowance", U.S. Appl. No. 10/072,396, Supplemental, filed Sep. 1, 2009,4 pages.

"Java Speech API Programmer's Guide", Sun Microsystems, Version 1.0, Oct. 1998.

"Winamp 3 Preview", http://www.mp3newswire.net/stories/2001/winamp3.htm, (May 23, 2001),1-3.

"Winamp2: Winamp's Subwindows", http://www.winamp-fag.de/english/wa2/documentation/sub.htm. 2000, Digitalk.

"Winamp 3 Preview". http://www.mp3newswire.net/stories/2001/winamp3,htm. May 23, 2001.

"Java Speech API Programmer's Guide", Version 1.0, Oct. 1998.

"Java Speech API Specifications", Version 1.0, 1997-1998.

* cited by examiner

DISPLAY LIST
100

DISPLAY LIST
110

GUI
120

SYSTEMS AND METHODS FOR CREATING AND MANAGING GRAPHICAL USER INTERFACE LISTS

PRIORITY TO RELATED APPLICATIONS

This continuation application claims priority to co-pending U.S. patent application Ser. No. 10/072,396 filed Feb. 5, 2002, entitled "Systems and Methods For Creating And Managing Graphical User Interface Lists," to Bailey et al.

TECHNICAL FIELD

The systems and methods described herein relate to graphical user interface lists. More particularly, the described invention relates to systems and methods for providing a standard list function to create a graphical user interface list and list manager while allowing the graphical user interface to vary by appearance.

BACKGROUND

Lists are a prominent part of most graphical user interfaces and are typically used to display a list of selections available to a user. For example, clicking on a toolbar item usually causes a list to drop down or pop up from the toolbar. A user may then make a selection from the drop down list that is revealed.

In a desktop computing environment, lists commonly consist of a vertical column of text items, in which text is displayed to indicate the function of the button. The functionality provided by such a list is adequate for the needs required by most applications that run on the desktop system. In some systems, such as the WINDOWS family of operating systems produced by MICROSOFT CORP., a developer of such applications does not have to write new computer instructions, or code, for each list that the developer wants to create. Instead, a list control is provided that the developer uses to define parameters of the list. The control includes executable code that actually creates the form of the list. As a result of using such a control, the developer can become accustomed to a standard way of efficiently creating and manipulating lists.

While such a system works well for desktop environments, manufacturers of today's embedded computer products, e.g., cell phones, personal digital assistants (PDA), appliances, etc., tend to want to create a more rich visual experience to make a product more attractive to consumers. As a result, embedded computer systems are designed that provide graphical functionality that applications may use while allowing applications to control the appearance of graphics.

For example, automobile manufacturers are beginning to install one or more computers in most vehicles, the computers being used for navigation systems, sound systems, and the like. Lists are used in those systems to provide an interaction between the system and a user, e.g., a sound system may provide a list that contains several choices for CD play mode such a play, pause, repeat, etc. An automobile manufacturer wants to create a sensory experience that is unique to a particular manufacturer, so that the experience becomes associated with that manufacturer. As a part of the sensory experience, the manufacturer may want to create unique-looking lists, such as a unique way to display a CD play mode list.

The drawback in providing a unique visual experience for each different manufacturer is that applications must be created separately for each individual manufacturer. What is needed is a way to provide applications developers standardized way to create common user interface mechanisms, such as lists, while affording a product manufacturer to alter the visual appearance of the user interface.

SUMMARY

Systems and methods are described for creating and managing graphical user interface (GUI) lists and for providing a GUI list function for application development. The described systems and methods provide an application developer with a standardized way to create lists for a graphical user interface while maintaining a manufacturer's freedom to use any visual style for the graphical user interface.

A list manager is created in an application by a list control. Instead of writing the basic functions for creating and presenting a list in a GUI, an application developer simply places the list control into the application. The list control includes a method that is used by the developer to set properties for the list manager. List manager properties determine the link between a button associated with a list (such as a scrolling button) and its function, and a source for data to populate the list.

The list manager pumps appropriate list data from a data source to display controls—i.e., buttons—on a graphical user interface. The list manager receives input from the GUI and processes the input with data from the data source. For example, if the list manager receives input to scroll up, the list manager determines which data should be displayed in a list after it is scrolled up and provides the appropriate data for display.

As previously noted, the list manager is used in applications that utilize a graphical user interface that includes lists. However, the list manager does not provide any visual quality to the GUI. Therefore, a list manager application may be written that uses a GUI without actually defining the appearance of the GUI. Multiple other applications written to define the GUI may be used in conjunction with the list manager application to provide multiple interactive experiences that utilize the same list manager application.

BRIEF DESCRIPTION OF THE DRAWINGS

A more complete understanding of exemplary methods and arrangements of the present invention may be had by reference to the following detailed description when taken in conjunction with the accompanying drawings wherein.

DETAILED DESCRIPTION

Figure 1A:
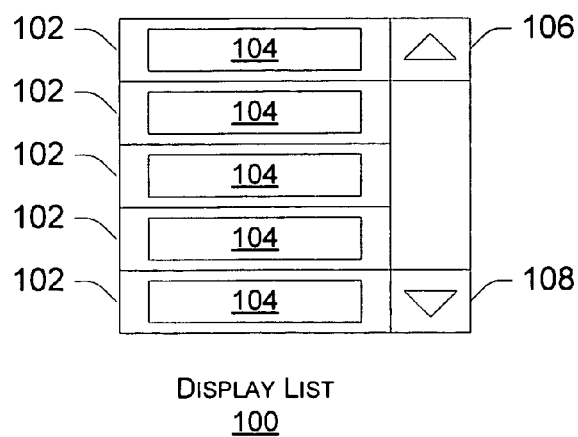
FIG. 1a is an illustration of a display list.

This invention concerns a computer operating system that runs applications that provide a graphical user interface (GUI) that includes display lists. The invention relates to creating and managing the display lists. An application using the present invention may be used in conjunction with other applications to present various and unique visual presentations that handle list data similarly. The present invention may at times be described according to an automobile computer implementation. However, it is noted that the features described herein may be applied to any computer system or application that utilizes display lists in a graphical user interface.

Computer-Executable Instructions/Modules

The invention is illustrated in the drawings as being implemented in a suitable computing environment. Although not required, the invention is described in the general context of computer-executable instructions, such as program modules, to be executed by a computing device, such as a personal computer or a hand-held computer or electronic device. Generally, program modules include routines, programs, objects, components, data structures, etc. that perform particular tasks or implement particular abstract data types. Moreover, those skilled in the art will appreciate that the invention may be practiced with other computer system configurations, including multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Overview

A list manager is described that provides a standard method of creating and managing display lists ("lists"). The list manager fills, scrolls, and notifies an application when a list item in a list has been selected. The list manager does not show any visible user interface, but pumps list item elements to a set of attached display controls, such as buttons, sliders, labels, meters, knobs, checkboxes, palettes etc.

Information related to the invention described herein is described in U.S. patent application Ser. No. 09/603,846 by Richard St. Clair Bailey, entitled "Methods and Systems For Manipulating User Interface Controls" and assigned to MICROSOFT CORP.

GUI Lists

FIG. 1a is an illustration of a display list 100 that is typical of a graphical user interface (GUI). The display list 100 includes several selectable list items 102. In this example, there are five list items 102. However, it is noted that a list may have any practical number of list items, depending on the environment. The list items 102 are populated with list elements 104 from a data list (not shown). A list element 104 is content to fill a single list item. If a data list has more list elements 104 than there are list items 102 in the display list 100, an up scroll button 104 and a down scroll button 106 allow a user to scroll up or down, respectively, to re-populate the list items 102 with appropriate list elements 104.

Most desktop computers and many embedded computers use display lists similar to the display list 100 shown in FIG. 1a. As previously discussed, there are manufacturers that install embedded computers in the manufacturer's products, such as automobile manufacturers that use embedded computers for navigation or sound systems. Many of these manufacturers do not want the familiar, ordinary-look provided with a display list similar to the display list 100 shown.

Figure 1B:
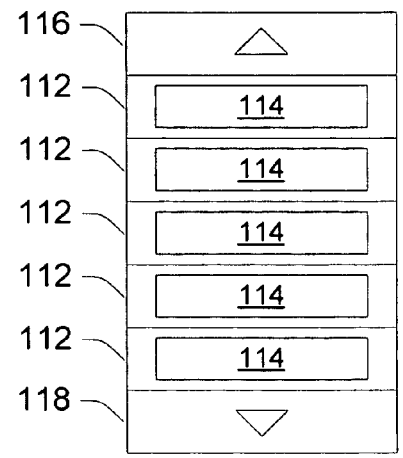
FIG. 1b is an illustration of a display list.

For example, FIG. 1b is an illustration of a display list 110 that is a little different in its look and feel. The display list 110 includes list items 112 and list elements 114 similar to the list items 102 of display list 100. But the display list 110 has an up scroll button 116 and a down scroll button 118 that are positioned differently than in FIG. 1a. The scroll up button 116 is located above the list items 112 and the scroll down button 118 is located below the list items 112.

This is a small but significant difference. By presenting the scroll buttons 116, 118 in a non-standard location (supposing that display list 100 represents a standard layout), the display list 110 may not operate properly with software applications that are written to work with the standard display list layout. The possibilities can be even more extreme.

Figure 1C:
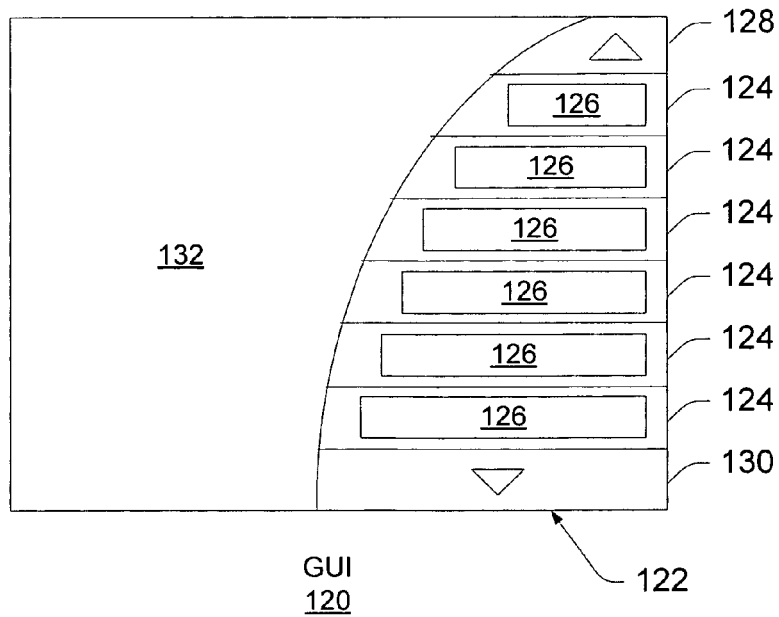
FIG. 1c is an illustration of a display list.

FIG. 1c is an illustration of a GUI 120 that includes a display list 122. Even though the display list 122 includes list items 124, list elements 126, an up scroll button 128 and a down scroll button 130 like the display list 100 shown in FIG. 1a, the display list 122 has a markedly different appearance. The display list 122 is a sweeping design wherein the list items 124 are of differing sizes. (A display area 132 is also shown as visible in a part of the GUI 120 that is not covered by the display list 122).

An application written to utilize a standard design list layout may not know how to create the display list 122 and manage list elements 126 to be displayed in the display list 122. As a result, a new and unique version of the application would have to be written to accommodate the use of such a display list. This is highly undesirable, given the large number of different systems on which a particular application may be—at least potentially—run.

The following discussion describes a solution to that problem: a control mechanism is provided that allows automated layout of display lists while still allowing an original equipment manufacturer (OEM) to utilize a unique visual layout for displaying lists.

This type of functionality could be useful in the following, and other, scenarios.

A street name list application can efficiently handle scrolling through a data list of a thousand street names and selecting one. To provide adequate performance, the application provides only those list elements necessary to populate a limited number of list items on a display.

A photograph preview application can show a large photograph in the middle of a display and two smaller photographs on each of the left and right sides of the large photograph. Images are scrolled into and out of the large middle control similar to other more common controls.

An adaptive graphic equalizer application can send a request to a system asking how many graphic equalizer bands are supported. The graphic equalizer bands can then be displayed in a scrolling list. In this case, the list items are not buttons, but sliders. In fact, any type of control can be used as the list items in a display list.

Having a list manager control to create and manage virtually any type of display lists saves application developers from having to create a unique version of the application for any use other than a standard use.

Exemplary List Manager

Figure 2A:
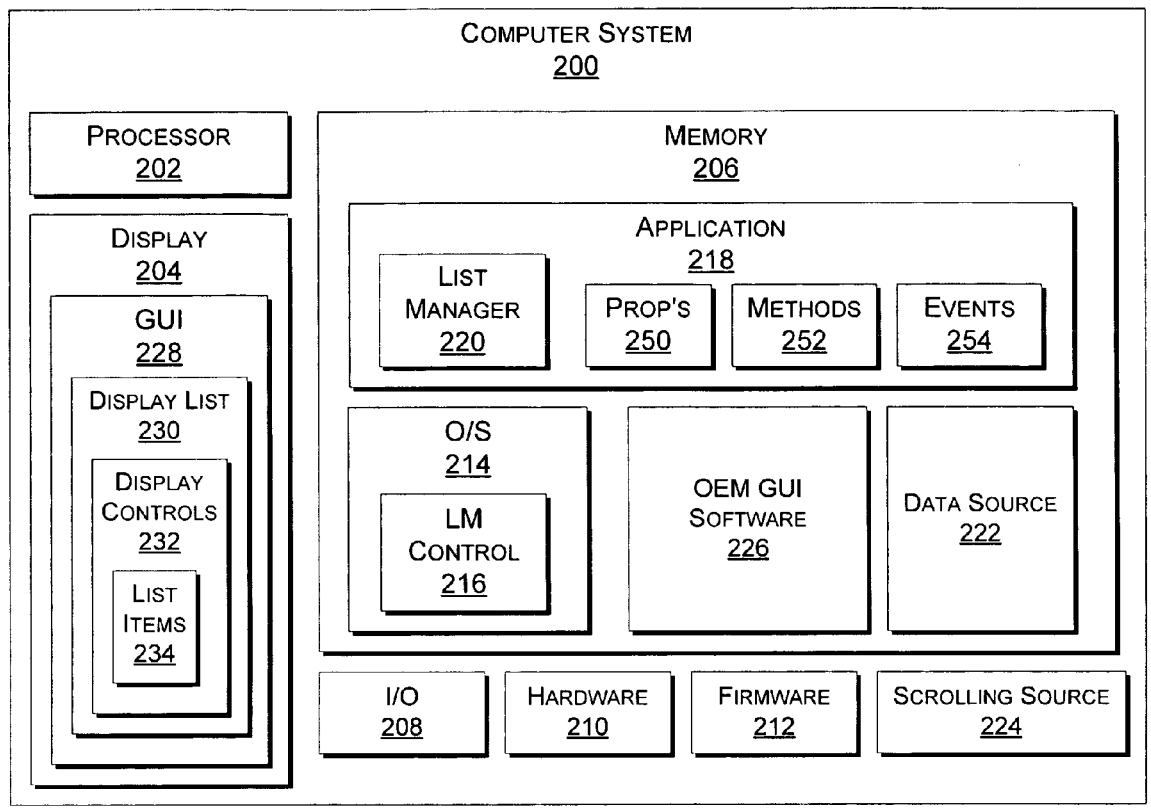
FIG. 2a is a block diagram of a computer system conforming to the invention described herein.

FIG. 2a is a block diagram of a computer system 200 conforming to the invention described herein. The computer system 200 includes a processor 202, a display 204 and memory 206. The computer system 200 also includes an input/output (I/O) unit 208 that may include hardware, software or a combination of the two. The I/O unit 208 allows a user to input data into the computer system 200, and allows the computer system 200 to output data to a user. The I/O unit 208 may comprise more than one component, such as a key pad, a microphone, a speaker, and the like (not shown).

The computer system 200 also includes hardware 210 and firmware 212. The hardware 212 includes any system-specific hardware that may be necessary for the computer system 200 to function in a particular manner. The firmware 212 is software that is executable on the processor 202, the software enabling the hardware 212 to operate properly on the computer system 200.

The memory 206 of the computer system 200 stores an operating system 214 that includes, among other modules (not shown) that are typically found in an operating system, a list manager control 216 that may be copied into applications to provide list manager functionality to the application. The memory 206 also stores a software application 218 that utilizes the list manager control 216.

The application 218 includes a list manager 220 created with the list manager control 216. Although in the list manager 220 is described as being created with the list manager control 216, it is noted that the list manager 220 may be created in a variety of ways. For example, the list manager 220 could be created by a COM (Common Object Model) object or a by initializing a class.

A data source 222 is stored in the memory 206 and provides a data resource for the list manager 220 so that the list manager 220 can populate the display list 230. Although the data source 222 is shown stored in the memory 206, the data source 222 may be located on one or more computer-readable media or may be provided live over a network such as the Internet. The list manager 220 also receives input from a scrolling source 224 that tells the list manager 220 when a scrolling event occurs. OEM graphical user interface software 226 is stored in the memory 206 and is configured to provide a GUI 228 on the display 204. As part of the GUI 228, display list 230 is configured to display one or more selectable display controls 232 to a user. The display controls 232 make up the display list 230 as described earlier, with each display control 232 displaying a list item 234 in the display list 230. The display controls 232 shown on the GUI 228 are selectable by a user, such as by a user positioning a cursor over the display controls 232 and clicking. Although only one block is shown to represent the display controls 232 and one block is shown to represent the list items 234, it should be understood that there may be multiple display controls 232 and multiple list items 234, and that each control displays a list item 234.

The list manager 220 also includes certain properties 250, methods 252 and events 254. These will be discussed in greater detail, below.

Figure 2B:
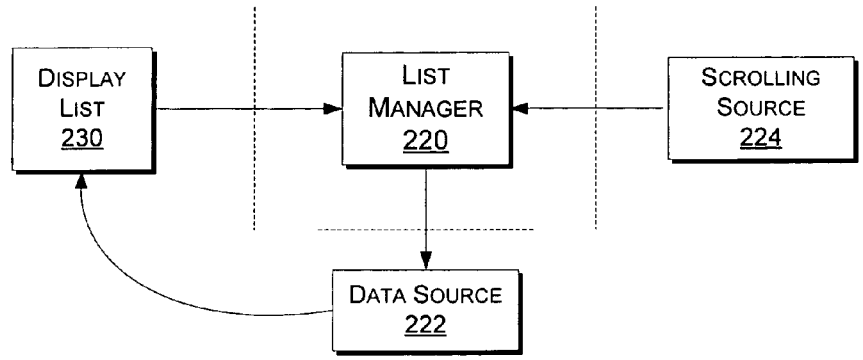
FIG. 2b is a block diagram of a list manager and related components.

FIG. 2b is a block diagram that illustrates in more detail some of the elements shown in FIG. 2a. The display list 230 attaches itself to the list manager 220 and provides information to the list manager 220 about the list items 234 included in the display list 230. The display list 230 also provides events to the list manager 220. The list manager 220 provides a pointer to the data source 222 to set up a link between the data source 222 and the display list 230. The scrolling source 224 indicates to the list manager 220 when to scroll, how many items to scroll, and which direction to scroll the display list 230. The list manager calculates what data is required from the data source 222. The data source 222 then provides this data to the display list 230.

Use of the list manager control 216 and components related to it will be discussed in greater detail below.

Scrolling Behavior

There are six core scrolling events that are supported by the list manager 220: First Item, Last Item, Previous Item, Next Item, Previous Page and Next Page. The following examples assume there are five list items 234 and twenty possible list elements in the data source 222 that may be displayed in the five list items 234.

The First Item scrolling event clears any current list items 234 and fills the five list items 234 with the first five list elements.

Example:
displayed list elements prior to scroll=4, 5, 6, 7, 8
displayed list elements after scroll=1, 2, 3, 4, 5

The Last Item scrolling event clears any current list items 234 and fills the five list items 234 with the last five list elements.

Example:
displayed list elements prior to scroll=4, 5, 6, 7, 8
displayed list elements after scroll=16, 17, 18, 19, 20

The Previous Item scrolling event shows one new list element (the previous list element) and the following four list elements.

Example:
displayed list elements prior to scroll=4, 5, 6, 7, 8
displayed list elements after scroll=3, 4, 5, 6, 7

The Next Item scrolling event shows one new list element (the next list element) and the previous four list elements.

Example:
displayed list elements prior to scroll=4, 5, 6, 7, 8
displayed list elements after scroll=5, 6, 7, 8, 9

The Previous Page scrolling event clears any current list items 234 and shows five new list elements - the five list elements before the current list items 234. If there are not enough list elements to fill an entirely new page, the scrolling action taken is similar to a First Page scrolling event.

Example:
displayed list elements prior to scroll=4, 5, 6, 7, 8
displayed list elements after scroll=1, 2, 3, 4, 5

The Next Page scrolling event clears any current list items 234 and shows five new list elements—the five list elements after the current list elements. If there are not enough list elements to fill an entirely new page, the scrolling action taken is similar to a Last Page scrolling event.

Example:
displayed list elements prior to scroll=4, 5, 6, 7, 8
displayed list elements after scroll=9, 10, 11, 12, 13

It is noted that although the list manager 220 knows that there are five list items 234, the data source 222 does not have to be aware of this fact. This is because the list manager 220 is linked to the display controls 232.

Methodological Implementation: List Manager

Figure 3:
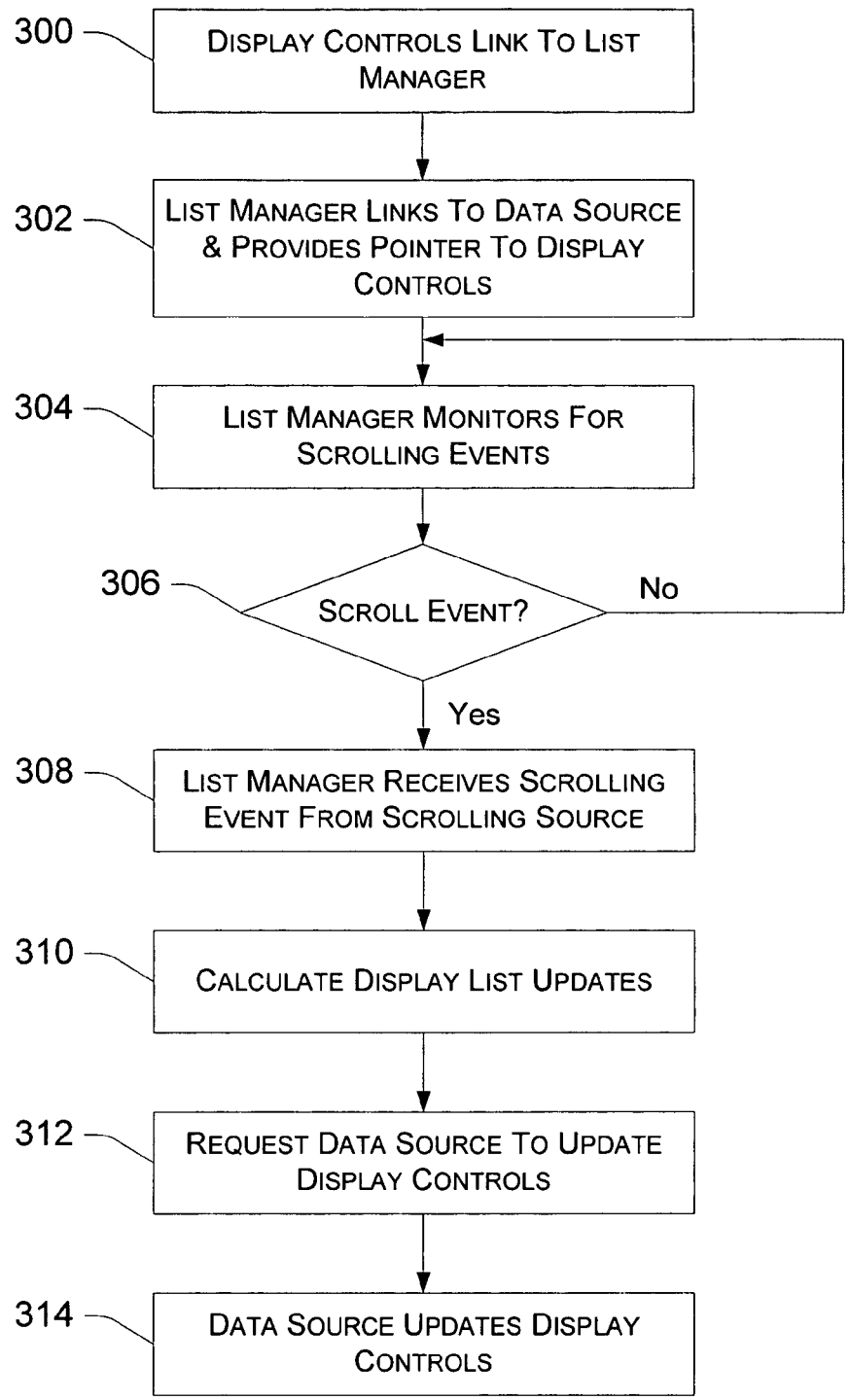
FIG. 3 is a flow diagram depicting a methodological implementation of a list manager in accordance with the present invention.
Figure 4:
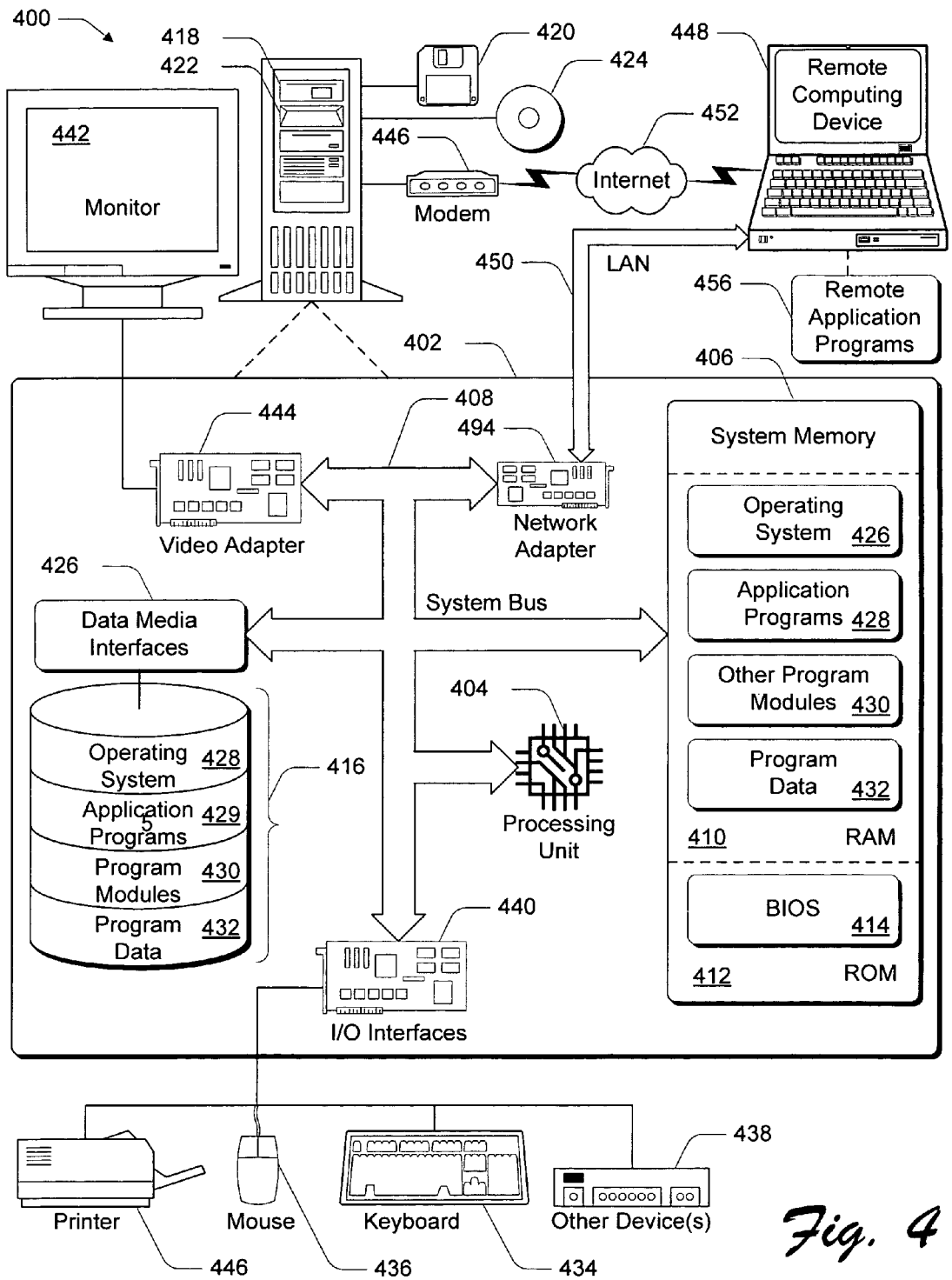
FIG. 4 is a diagram of an exemplary system on which the present invention may be implemented.

FIG. 3 is a flow diagram depicting a methodological implementation of a list manager in accordance with the present invention. At block 300, the display controls 232 on the graphical user interface 228 link to the list manager 220. The list manager 220 then links to the data source 222 that will be used to provide data to the display controls 232 (block 302) and provides a pointer to the data source 222 that references the display controls 232. This allows the data source 222 to provide data directly to the display controls 232. It is noted that the GUI 228 is a separate process from the application 218. As a result, the GUI 228 may change but still operate with the list manager 220. Therefore, different GUIs will operate with the list manager 220 and will have a similar look and feel.

At block 304, the list manager 220 monitors for scrolling events that occur on the GUI 228. Even though the GUI 228 is separate from the list manager 220, the list manager 220 is informed of scrolling events by virtue of the linkage between the list manager 220 and the display controls 232 on the GUI 228.

As long as no scrolling event is received ("No" branch, block 306), the list manager 220 continues to monitor for scrolling events. If a scrolling event is detected ("Yes" branch, block 306), then the list manager receives the scrolling event at block 308.

The list manager 220 calculates updates that should be made to the display list 230 in accordance with the scrolling event (block 310). It then requests that the display source 222 update data for the display items 234 at block 312. The data source 222 provides the appropriate data for the list positions requested by the list manager 220.

List Manager: Properties, Methods and Events

The following discussion provides more detail to the function of the list manager 220 by describing the properties 250, methods 252 and events 254 utilized by the list manager 220. The properties, methods and events are exemplary only. It is noted that the properties may be implemented as methods or events. Similarly, methods may be implemented as properties or events, and events may be implemented as properties or methods.

In the discussion that follows, implementations specific to one or more versions of the WINDOWS family of operating system by MICROSOFT CORP. may be described. This does not imply that the present invention is limited to a WINDOWS operating system. The present invention, including the list manager and its properties, methods, events and style class settings may be implemented with any operating system that supports the functions described below. The properties, methods and events described are not necessarily described in any relevant order.

A list manager control is instantiated within the application. At this time, the list manager properties are set to enable the list manager 220 and any necessary key assignments (such as for scrolling keys) are made.

Since the list manager 220 does not take up any visible screen area, visual controls must be attached to the list manager 220. The first step to accomplish this is to call the Attach Item Control method to attach each display control 232 to the list manager 220 and give it a usage identifier. The list manager 220 is configured to trap notifications from these attached controls and generate list notifications.

Scrolling controls are attached by calling an Attach Scroll Control method, which tells the list manager 220 how to scroll the list when this control is actuated. Scrolling occurs in a direction and by a scroll interval. The scroll interval page means to scroll by the number of list item controls The list manager 220 may be informed to scroll as follows:

| Command | Direction | Interval |
| --- | --- | --- |
| Scroll First Item | Backward | List End |
| Scroll Last Item | Forward | List End |
| Scroll Prev Page | Backward | Page |
| Scroll Next Page | Forward | Page |
| Scroll Prev Item | Backward | Item |
| Scroll Next Item | Forward | Item |

To put list elements into the list manager 220, the data source 222 must be linked to the list manager 220. An interface containing the list manager events requests the data source 222 to fill the list items 234 with list element data. The list manager 220 requests that controls attached as a result of calling AttachItemControl method be populated by passing a reference to the controls to the data source within the event.

In addition, the interface includes a Refresh Content method and a Scroll method. The Refresh Content method erases the content in the list and requests it fresh from the data source 222 beginning with a provided parameter (Starting Element). The Scroll method scrolls the display list 228 by a provided parameter (Items To Scroll).

When used in conjunction with AttachScrollControl, referenced above, the list manager scrolls the list by a fixed amount set when the scroll control was attached. The list manager 220 also can request keyboard input to go directly to itself. When this key input is received, the list manager 220 calls an AutoScroll method on the attached style class and this method determines the appropriate scroll action. The method then affects this action by calling the Scroll method on the list manager 220 to scroll the display list 230.

Also with regard to auto scrolling, the list manager 220 makes no presumptions about the orientation and visual interaction model of the layout of the display list 230, the list manager 220 must be configured as to what events should result in auto scrolling.

The list manager 220 is configured to fire several events as needed. An Item Clicked event is sent when a list item is clicked. A Provide Content event is used to request data from the data source 222. The Provide Content event is fired when the list manager 220 needs data to fill a list item 234.

A Scroll Content event is used to request the data source 222 to copy content from one control to another. The list manager 220 sends multiple events to scroll—one event for each visible list item 234

A Scroll Changed event is fired to indicate that it is time to update the scrolling indicators. This event is sent whenever the list manager has finished a scrolling event. This gives the application 218 a chance to update the user interface, for example, to disable or hide scroll indicators.

The first parameter is true when there are additional list items toward the top of the list. The second parameter is true when there are additional list items toward the bottom of the list.

Some interfaces include control groupings that are mutually exclusive, e.g., Radio Buttons groups in which only one of the radio buttons are set at a time and setting one button within the group will unset the other buttons. This scenario is enabled by the List Manager forwarding all events it receives from the display list items on to the data source 222. When the list manager 220 forwards these events it adds two additional pieces of information: a reference to the control that sent the event and a unique identifier specifying which data element that particular control is currently displaying.

The list manager 220 extends all display list controls by wrapping them and adding an additional property that it uses to store this unique identifier. The data source 222 fills in this identifier and has complete flexibility as to the numbering scheme used to ensure the uniqueness of these identifiers. This identifier does not need to be unique to the entire data set, however, it must be unique while it is visible within a display list item. This enables applications to request more detail about a data element from the data source 222 beyond that which is currently displayed within the display list items.

This provides the additional feature that the application 218 can listen to events from the list manager 220 alone, instead of listening to events from the individual display list items. For example, a contacts application could listen to the list manager 220 for item focused events and fill in a detail pane by requesting more information from the data source 222 regarding the data element that just got focused.

Exemplary Computer Environment

The various components and functionality described herein are implemented with a number of individual computers. FIG. 5 shows components of typical example of such a computer, referred by to reference numeral 500. The components shown in FIG. 5 are only examples, and are not intended to suggest any limitation as to the scope of the functionality of the invention; the invention is not necessarily dependent on the features shown in FIG. 5.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 5, the components of computer 500 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 500 typically includes a variety of computer-readable media. Computer-readable media can be any available media that can be accessed by computer 500 and includes both volatile and nonvolatile media, removable and non-removable media. By way of example, and not limitation, computer-readable media may comprise computer storage media and communication media. "Computer storage media" includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 500 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface such as interface 550.

The drives and their associated computer storage media discussed above and illustrated in FIG. 5 provide storage of computer-readable instructions, data structures, program modules, and other data for computer 500. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 500 through input devices such as a keyboard 562 and pointing device 561, commonly referred to as a mouse, trackball, or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port, or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer may operate in a networked environment using logical connections to one or more remote computers, such as a remote computer 580. The remote computer 580 may be a personal computer, a server, a router, a network PC, a peer device or other common network node, and typically includes many or all of the elements described above relative to computer 500, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets, and the Internet.

When used in a LAN networking environment, the computer 500 is connected to the LAN 571 through a network interface or adapter 570. When used in a WAN networking environment, the computer 500 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 500, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

CONCLUSION

The systems and methods as described, thus provide a way to provide a standardized way to create common user interface mechanisms, such as display lists, while affording a product manufacturer to alter the visual appearance of the user interface. As a result, a single application can be utilized on multiple platforms to provide similar user experiences.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A list generating engine that extends an application program interface (API) comprising:
   a processor; and
   computer readable storage media, having stored thereon computer executable instructions, that when executed by the processor provide:
      means for receiving a list manager application that includes a list manager, wherein the list manager is configured to manage display lists by receiving input from a graphical user interface (GUI) and processing the input with list data from a data source, and wherein the list manager application does not provide visual quality to the GUI;
      means for integrating the list manager application with a GUI application, wherein the GUI application provides a unique visual layout for the list manager application, and wherein the GUI application includes a display list;
      means for attaching user-selectable display controls to the display list;
      means for accessing data elements from a data source, the data elements to be displayed in the display controls;
      means for establishing a display state of the display controls;
      means for receiving a request to change data elements in the display controls;
      means for managing the data elements in the display controls according to the display state, wherein the means for managing the data elements is configured to:
         add a reference to a respective said display control that sent an event and a unique identifier specifying which said data element that particular control is currently displaying; and
         forward the event having the reference and the unique identifier to the data source, the unique identifier enabling the GUI application to listen to the list manager for the event without listening to a data item associated with said data element; and
      means for integrating the list manager application with an additional GUI application, wherein the additional GUI application provides an additional unique visual layout for the list manager application that is different than the unique visual layout provided by the GUI application.

2. The list generating engine as recited in claim 1, further comprising computer executable instructions, that when executed by the processor provide means for changing the display state of the display controls while continuing to manage the data elements in the display controls.

3. The list generating engine as recited in claim 2, wherein the display state of the display controls changes between a request to change data elements in the display controls and an actual change of the data elements in the display controls.

4. The list generating engine as recited in claim 2, wherein the display state of the display controls changes while data elements in the display controls are changing.

5. The list generating engine as recited in claim 4, wherein the display state changes in response to a selection of a user of the list generating engine.

6. The list generating engine as recited in claim 1, further comprising computer executable instructions, that when executed by the processor provide means for managing the display state of the display controls, wherein the means for managing the display state of the display controls functions simultaneously with the means for managing the data elements in the display controls.

7. The list generating engine as recited in claim 1, wherein the unique identifier enables the application to request more detail about a particular said data element from the data source beyond that which is currently displayed within the display list.

8. A method comprising:
   receiving a list manager application that includes a list manager, wherein the list manager is configured to manage display lists by receiving input from a graphical user interface (GUI) and processing the input with list data from a data source, and wherein the list manager application does not provide visual quality to the GUI;
   integrating the list manager application with a GUI application, wherein the GUI application provides a unique visual layout for the list manager application, and wherein the GUI application includes a display list;
   attaching user-selectable display controls to the display list;
   accessing data elements from a data source, the data elements to be displayed in the display controls;
   establishing a display state of the display controls;
   receiving a request to change data elements in the display controls;
   managing the data elements in the display controls according to the display state by adding a reference to a respective said display control that sent an event and a unique identifier specifying which said data element that particular control is currently displaying; and
   forwarding the event having the reference and the unique identifier to the data source, the unique identifier enabling the GUI application to listen to the list manager for the event without listening to a data item associated with said data element; and
   integrating the list manager application with an additional GUI application, wherein the additional GUI application provides an additional unique visual layout for the list manager application that is different than the unique visual layout provided by the GUI application.

9. The method as recited in claim 8, wherein the display state of the display controls changes between a request to change data elements in the display controls and an actual change of the data elements in the display controls.

10. The method as recited in claim 8, wherein the display state of the display controls changes while data elements in the display controls are changing.

11. The method as recited in claim 10, wherein the display state changes in response to a selection of a user of the list generating engine.

12. The method as recited in claim 8, further comprising managing the display state of the display controls simultaneously while managing the data elements in the display controls.

13. A method comprising:
   integrating a list manager application that includes a list manager with a graphical user interface (GUI) application, wherein the list manager is configured to manage display lists by receiving input from the GUI and processing the input with list data from a data source, and wherein the list manager application does not provide visual quality to the GUI, and wherein the list manager is configured to provide a unique identifier that enables the GUI application to listen to events from the list manager without listening to events from individual display list items;
   using the list manager application in conjunction with a GUI application to render a display list that has a unique visual layout; and
   using the list manager application in conjunction with an additional GUI application to render an additional display list that has an additional unique visual layout that is different than the unique visual layout of the display list.

* * * * *